United States Patent [19]

Ohba et al.

[11] Patent Number: 4,468,659

[45] Date of Patent: Aug. 28, 1984

[54] ELECTROLUMINESCENT DISPLAY PANEL ASSEMBLY

[75] Inventors: Toshihiro Ohba, Nara; Yoshiharu Kanatani, Tenri; Hiroshi Kinoshita, Tenri; Morihisa Sogabe, Tenri; Yoshihide Fujioka, Tenri, all of Japan

[73] Assignee: Sharp Kabushiki Kaisha, Osaka, Japan

[21] Appl. No.: 294,245

[22] Filed: Aug. 19, 1981

[30] Foreign Application Priority Data

Aug. 25, 1980 [JP] Japan .............................. 55-117365
Aug. 28, 1980 [JP] Japan .............................. 55-119443
Aug. 28, 1980 [JP] Japan .............................. 55-119444

[51] Int. Cl.³ .......................................... G09G 3/30
[52] U.S. Cl. .................................... 340/719; 340/781; 340/760; 340/825.81
[58] Field of Search ............... 340/825.81, 815.15, 340/815.2, 700, 718, 760, 719, 781, 765, 784, 706; 368/223, 226

[56] References Cited

U.S. PATENT DOCUMENTS

3,668,688  6/1972  Schmersal ........................ 340/718
3,689,131  9/1972  Klein et al. ........................ 340/784
3,705,310 12/1972  Wild .................................. 340/784
3,928,658 12/1975  van Boxtel et al. ............... 340/765
3,974,637  8/1976  Bergey et al. ..................... 368/223
3,975,085  8/1976  Yamada et al. ................. 340/825.81
4,020,627  5/1977  Yoshida et al. ................... 340/765
4,200,868  4/1980  Lamoureux et al. .............. 340/771
4,231,640 11/1980  Funada et al. .................... 340/716

Primary Examiner—Marshall M. Curtis
Attorney, Agent, or Firm—Birch, Stewart, Kolasch & Birch

[57] ABSTRACT

An electroluminescent (EL) display panel circuit comprises an EL display panel having four sides, a driver circuit for driving the EL display panel, the driver circuit comprising shift register circuits for selectively sending data in bi-directions, terminals of the EL display panel connected to the driver circuit, the terminals being led out from at least two sides of the EL display panel, and flexible substrates for supporting the driver circuit in such a manner that one of the flexible substrates corresponding to one of at least two of the terminals is symmetrical to the other of the flexible substrates corresponding to the opposing other of the at least two of the terminals.

15 Claims, 27 Drawing Figures

ELECTROLUMINESCENT DISPLAY PANEL ASSEMBLY

BACKGROUND OF THE INVENTION

The present invention relates to a display panel assembly and, more particularly, to an electroluminescent (hereinafter referred to as "EL") display panel assembly.

The conventional EL display panel assembly comprises an X-Y matrix type EL display element, some integrated circuit (IC) drivers each comprising some shift registers for sending data only in one direction. Output terminals of one of the IC drivers are connected to any one of X-axis electrodes and Y-axis electrodes of the X-Y matrix type EL display element.

In such an arrangement, since the shift register contained in one of the IC drivers functions to send the data in only the one direction, it is necessary that the order of the connections between the output terminals of half of the IC drivers connected and the electrodes be reversed, normally by preparing through-holes in a substrate of the EL display panel assembly.

This prevented improvement of assembly density and a compact EL display panel assembly.

Therefore, it is desired that the EL display panel be assembled as small as possible.

SUMMARY OF THE INVENTION

Accordingly, it is an object of the present invention to provide an improved compact EL display panel assembly.

Briefly described, in accordance with the present invention, an electroluminescent (EL) display panel circuit comprises an EL display panel having four sides, a driver circuit for driving the EL display panel, the driver circuit comprising shift register circuits for selectively sending data in bi-directions, terminals of the EL display panel connected to the driver circuit, the terminals being led out from at least two opposite sides of the EL display panel, and flexible substrates for supporting the driver circuit in such a manner that one of the flexible substrates corresponding to the terminals on one side of the display panel is symmetrical to the other of the flexible substrates corresponding to the terminals on the opposite side of the display panel.

BRIEF DESCRIPTION OF THE DRAWINGS

The present invention will become more fully understood from the detailed description given hereinbelow and accompanying drawings which are given by way of illustration only, and thus are not limitative of the present invention and wherein.

DESCRIPTION OF THE INVENTION

Figure 1:
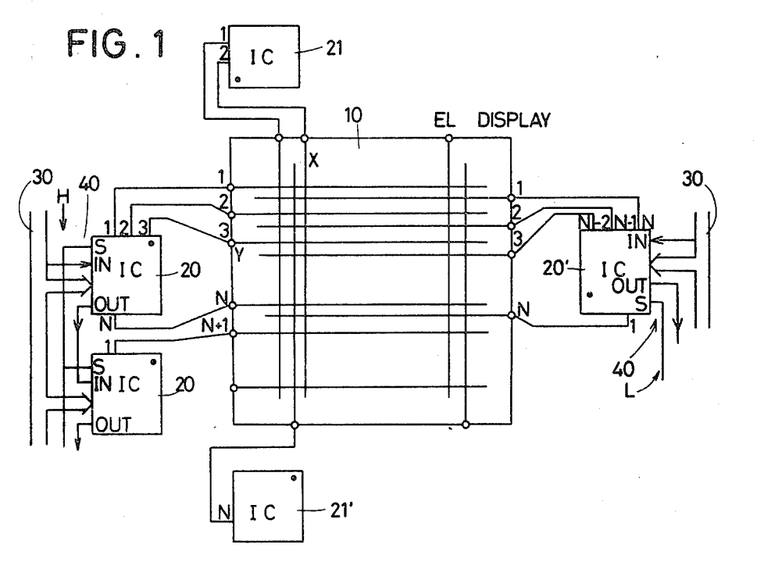
FIG. 1 shows a block diagram of an EL display panel assembly circuit according to the present invention.

With reference to FIG. 1, there is shown a block diagram of an EL (electroluminescent) display panel assembly circuit according to the present invention. The EL display panel assembly circuit comprises an EL display panel 10, integrated circuit (IC) drivers 20, 20', 21 and 21' and lines 30 for carrying signals and power energy.

Each of the IC drivers 20 and 21' has output terminals from the first to the n-numbered one. It has additionally an input terminal IN and an output terminal OUT for inputting and outputting the data signals, respectively. A control terminal S is further provided in each. A specific output terminal OUT in one of the IC drivers is connected to a specific input terminal IN in another IC driver following said one. Thus, data signals of n-number from the beginning are stored in said one IC driver and the following data signals of n-number are stored in the another IC driver.

Each of the IC drivers has some shift registers. The direction of shifting data in any one of the shift registers is selective. More particularly, when the input signal applied to the control terminal S is in high level "H", the data in the shift register are shifted from the first to the n-numbered output terminal. When the input signal applied to the control terminal S is in low level "L", the data in the shift register are shifted from the n-numbered to the first output terminal.

Since the technique of shifting data in bi-direction in the shift register is well known, further description is omitted.

Preferably, main surfaces of the IC drivers 20 and 21 are facing the front of a substrate for connecting to the EL display panel 10 while the opposite surfaces of the IC drivers 20' and 21' are facing the front of the substrate.

Figure 2:
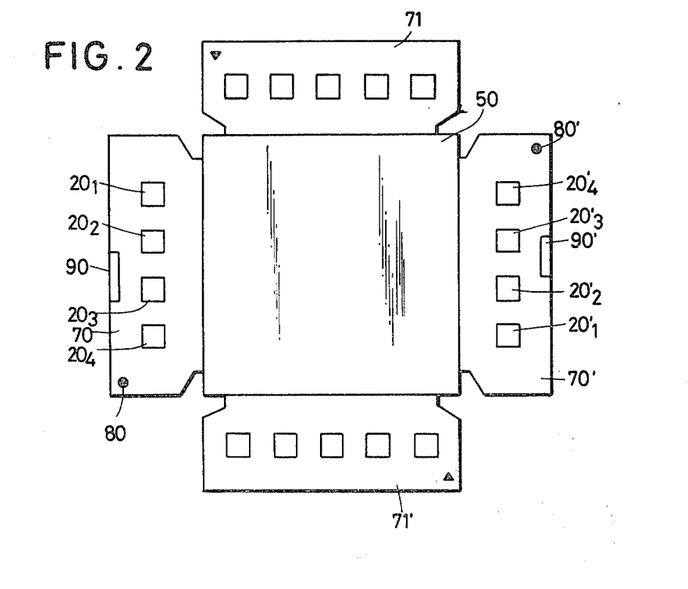
FIG. 2 shows a developing view indicating a combination of a flexible substrate and an EL display panel to form the EL display panel assembly according to the present invention.

FIG. 2 shows a developing view indicating a combination of the EL display panel assembly. This combination contains the IC drivers $20_1$ to $20_4$ and $20'_1$ to $20'_4$ flexible film substrates 70, 70', 71 and 71', and an EL display panel element 50. Each of the IC drivers contains some shift registers each for sending data in bi-directional directions. The IC drivers are arranged on the flexible film substrates.

The flexible film substrates are attached to the EL display panel element 50. Markers are denoted as 80 and 80', indicating a particular location. Terminals are denoted as 90 and 90', supplying data signals and power energy.

The output terminals OUT of the IC drivers $20_1$, $20_2$, $20_3$, $20'_1$, $20'_2$ and $20'_3$ are connected to the input terminals IN of the IC drivers $20_2$, $20_3$, $20_4$, $20'_2$, $20'_3$ and $20'_4$. The input terminal IN of the IC driver $20_1$ and the output terminal OUT of the In driver $20_4$ are connected to the terminal 90. The input terminal N of the IC driver $20'_1$ and the output terminal OUT of the IC driver $20'_4$ are coupled to the terminal 90'.

According to this circuit arrangement, when the control terminals S of the IC drivers $20_1$, $20_2$, $20_3$ and $20_4$ receive the input signal in the high level, the data signals are transferred from the input terminal IN of the IC driver $20_1$ to the output terminal OUT of the IC driver $20_4$ through the IC drivers $20_2$ and $20_3$, these IC drivers being coupled in series. Normally, the EL display panel 50 is driven according to the so-called multiplex driving or the line-at-a-time operation.

When the control terminals S of the IC drivers $20'_1$ to $20'_4$ receive the input signal in the low level, the data signals are transferred through the shift registers from the output terminal OUT of the IC driver $20'_4$ to the input terminal IN of the IC driver $20'_1$ through the IC drivers $20'_2$ and $20'_3$, there IC drivers being coupled also in series.

Similar operations of the IC drivers carried on the substrates 71 and 71' are enabled.

Thus, a symmetrical circuit configuration of the IC drivers on each side of the flexible film substrates 70 and 70' is possible.

Figure 3:
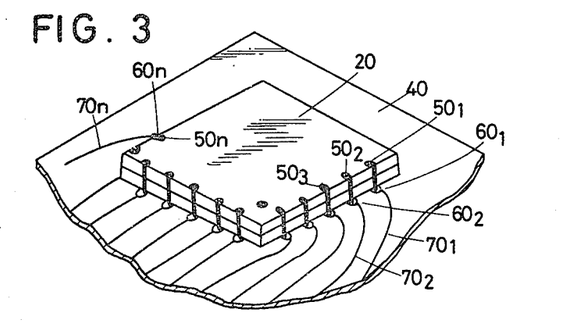
FIG. 3 shows a perspective view representing the combination of the flexible substrate and the EL display panel according to the present invention.

FIG. 3 shows a perspective view of the IC driver 20 connected to a substrate 40 similar to one of the flexible film substrates 70, 71, 70' and 71'. Preferably, the IC driver 20 is lead-less ceramic chip carrier type. Output terminal electrodes of the IC driver 20 are denoted as $50_1$ to $50_n$. Soldering elements are denoted as $60_1$ to $60n$. Lead lines on the substrate 40 are denoted as $70_1$ to $70_n$.

According to the present invention, main surfaces of some IC drivers are confronting the front surface of substrate 40 on one side of the display panel while opposite surfaces of the remaining IC drivers are confronting the front of the substrate 40 on the opposite side of the display panel.

In order to provide connection between the IC drivers 20, 20', 21, 21' and the terminal electrodes, it is unnecessary to provide any through-holes and wiring on a back surface.

Figure 4:
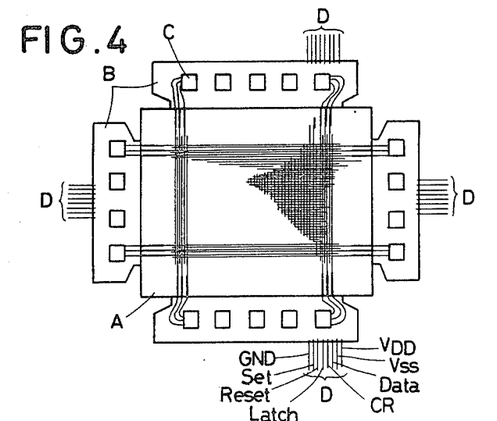
FIG. 4 shows a developing view indicating the combination of the flexible substrate and the EL display panel according to the present invention.

FIG. 4 shows a developing view indicating the combination of the flexible film substrate and the EL display panel matrix according to the present invention. The drawing of FIG. 4 is similar to that of FIG. 2.

In FIG. 4, the combination comprises a flexible film substrate B, IC drivers C, an EL display panel element A, and leads D. On the substrate B, the IC drivers C are disposed. The IC drivers C comprise a driver, a shift register, a latch circuit, and a logic circuit etc. In accordance with this arrangement, the number of the leads D necessary for controlling a plurality of X-axis electrodes and Y-axis electrodes on the EL display panel element A is minimized.

In each of the flexible film substrates D, the leads D contain 8 lines for data, clock (CR), latch, set, reset, ground (GND), power supply (VDD) for the EL display, and power supply (VSS) for the drivers.

If each of the X-axis electrodes and the Y-axis electrodes is lead out in one direction because of two of the flexible film substrates B, it is unnecessary to improve the number of the leads D. Further, when the number of the electrodes of the EL display panel is improved, it is unnecessary to improve the number of the leads D.

According to the present invention, a small number of leads D are lead out of the flexible film substrates B.

Figure 5A:
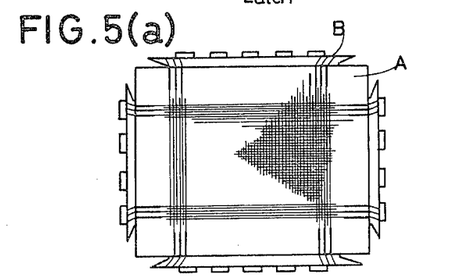
FIG. 5(a) shows a plan view indicating the combination of the flexible substrate and the EL display panel, in which the flexible substrate is bent backward at the right angle and circuit elements on the substrate are at right angle to the EL display panel.
Figure 5B:
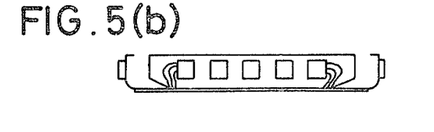
FIG. 5(b) shows a front view of the combination of FIG. 5(a)
Figure 5C:
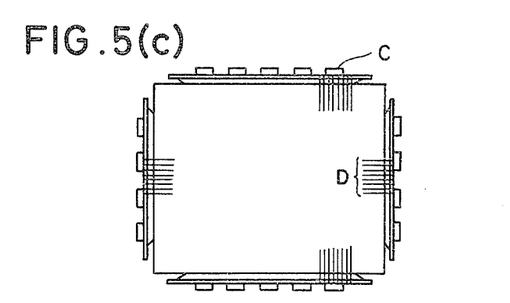
FIG. 5(c) shows a bottom view of the combination of FIG. 5(a)

FIGS. 5(a) through 5(c) show a specific example in which the flexible film substrate B is bent backward at the right angle and the IC drivers C on the substrate B are at right angle to the EL display panel A.

Figure 6A:
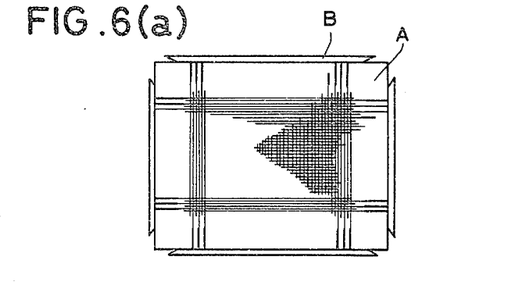
FIG. 6(a) shows a plan view indicating the combination of the flexible substrate and the EL display panel, in which the flexible substrate is bent backward at the right angle and circuit elements on the substrate are opposing to the EL display panel.
Figure 6B:
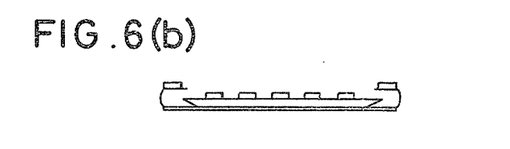
FIG. 6(b) shows a front view of the combination of FIG. 6(a)
Figure 6C:
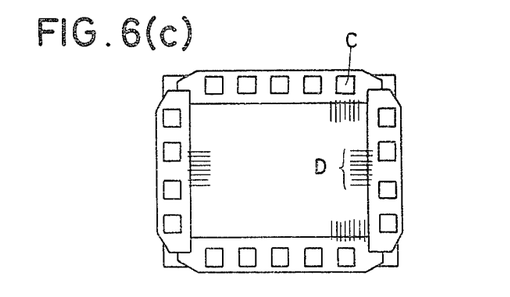
FIG. 6(c) shows a bottom view of the combination of FIG. 6(a)

FIGS. 6(a) through 6(c) show a specific example in which the flexible film substrate B is bent backward at the right angle and the IC drivers C on the substrate B are opposing to the EL display panel A.

Figure 7:
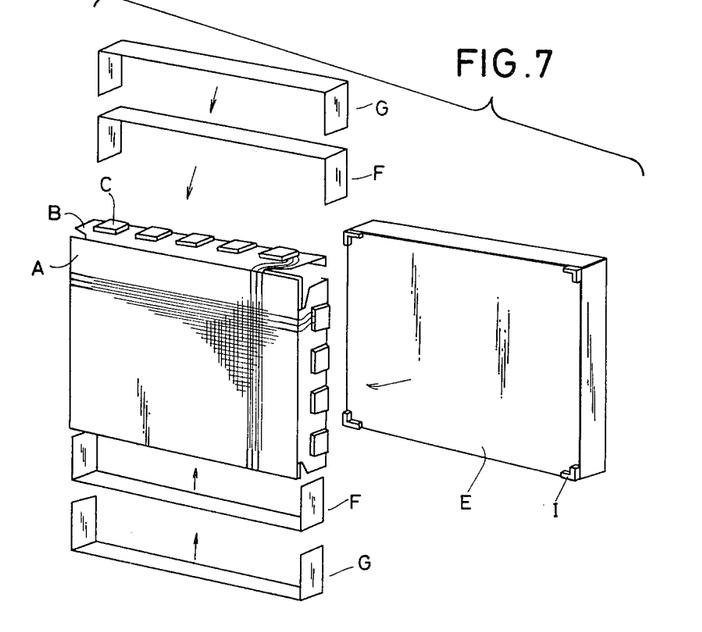
FIG. 7 shows an exploded view of elements of the EL display panel assembly.

As a further embodiment of the present invention, a rectangular inner chassis is provided for assembling the EL display panel A. FIG. 7 shows an exploded view of the elements of the EL display panel assembly.

Figure 8:
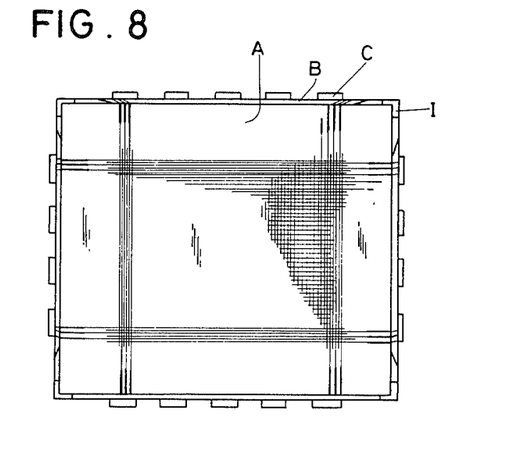
FIG. 8 shows a plan view of the EL display panel assembled to an inner chassis.

The flexible film substrates B bent as shown in FIGS. 5(a) through 5(c) are used. An inner chassis E is provided, which has an insulating sheet in its sides. Corner elements I for alignment are provided on the front corners of the chassis E. The corner elements I support the corners of the EL display panel element A. The sides of the inner chassis E touch with the flexible film substrate B as shown in FIG. 8.

In order to assure that the sides of the inner chassis E touch with the flexible film substrate B, two pressing elements G may be provided. The pressing element G covers the upper flexible film substrate B and part of the side flexible film substrates B. An insulating sheet F may be interposed between the pressing element G and the substrate B.

According to provision of the inner chassis E, it is possible that the EL display panel A and the flexible film substrates B are secured. Good resistance to mechanical shock can be obtained by the inner chassis E. The pressing element G provides protection for the flexible film substrates B and the IC drivers C etc. and assures thermal radiation.

Figure 9:
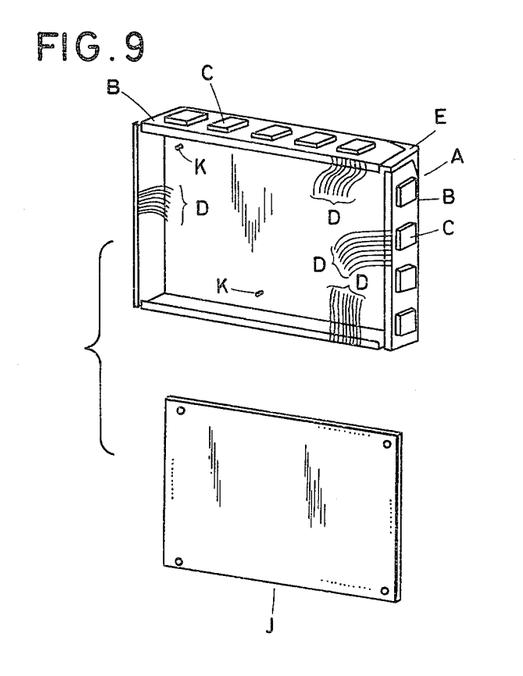
FIG. 9 shows an exploded view of the EL display assembly in which a printed circuit board is detached.
Figure 10A:
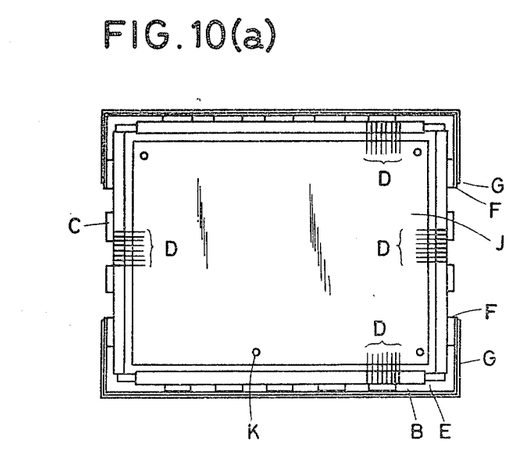
FIG. 10(a) shows a bottom view of the EL display panel assembly.
Figure 10B:
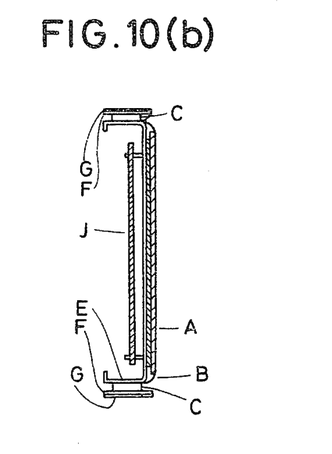
FIG. 10(b) shows a longitudinal sectional view of the assembly of FIG. 10(a)

As a further embodiment of the present invention, a printed circuit board J is disposed inside the inner chassis E. FIGS. 9, 10(a) and 10(b) show this embodiment.

With reference to these drawings, the inner chassis E supports the EL display panel A and the flexible film substrates B. The back of the chassis E is opened to reveal connectors K inside the chassis E. The printed circuit board J contains a control circuit and a power supply circuit etc. The board J is secured by the connectors K with a screw etc. The leads D on the substrates B are connected to circuit elements on the board J. This provides an improved compact circuit for the display system.

FIGS. 11 through 14, 15(a) to 15(c) and 16(a) to 16(c) show a specific example of the EL display panel assembly. The EL display panel 1 involved has a size of 16 inches. It contains 160 terminals as the X-axis electrodes and 120 terminals as the Y-axis electrodes.

As specific flexible film substrates, polyamide film substrates 2 are used. Each of the substrates 2 supports IC drivers 3. The substrates 2 are coupled to the EL display panel 1. To the substrates 2, a display unit containing a flat cable 4, an inner chassis 6, pressing elements 9, a cover 10-1, and a printed circuit board 11 are connected.

Figure 14:
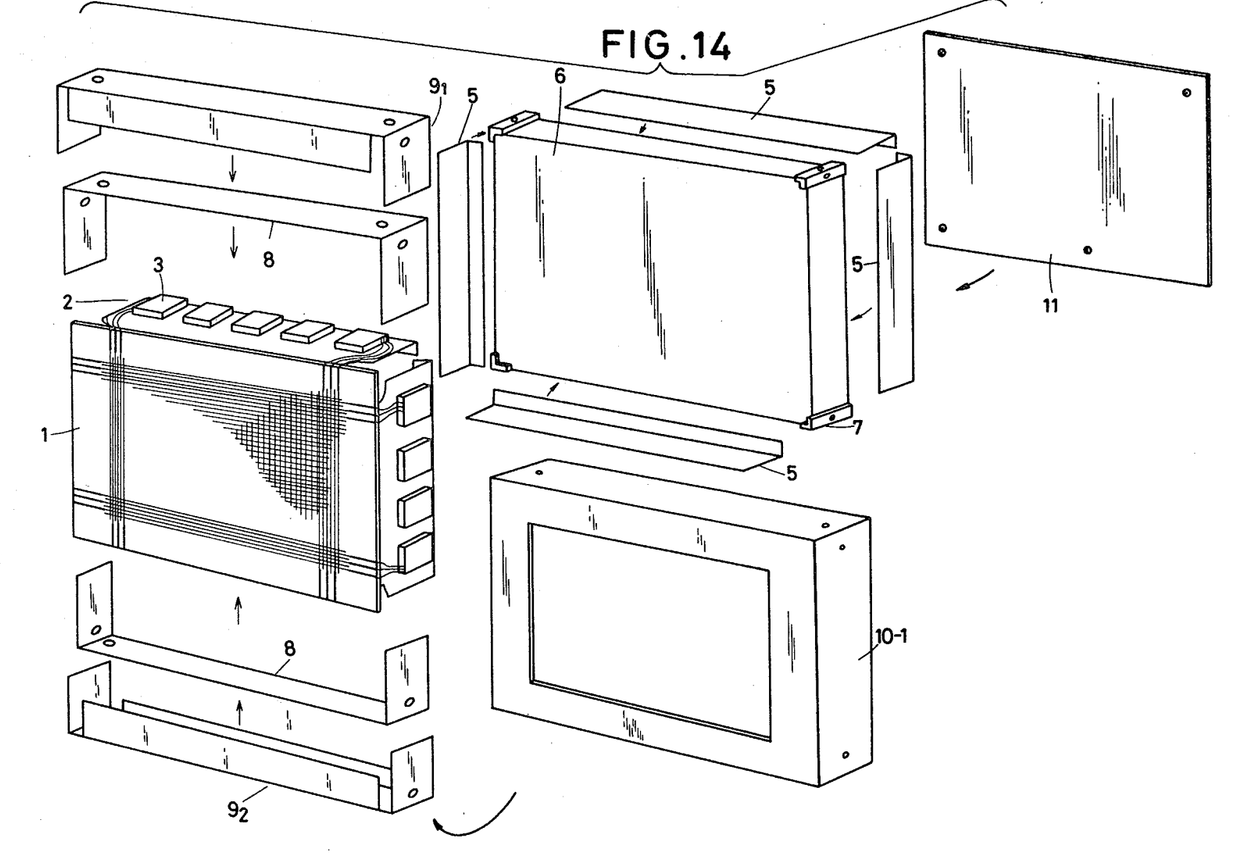
FIG. 14 shows an exploded view of elements of the EL display panel assembly.
Figure 15A:
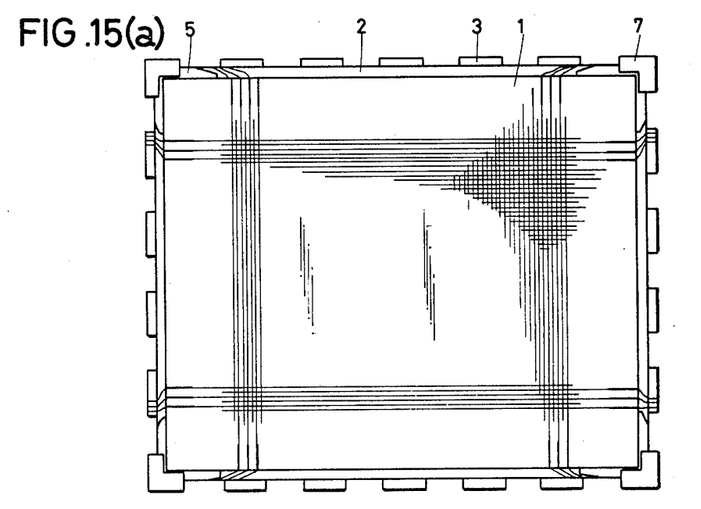
FIG. 15(a) shows a plan view of the EL display panel assembled to an inner chassis.
Figures 15B, 15C:
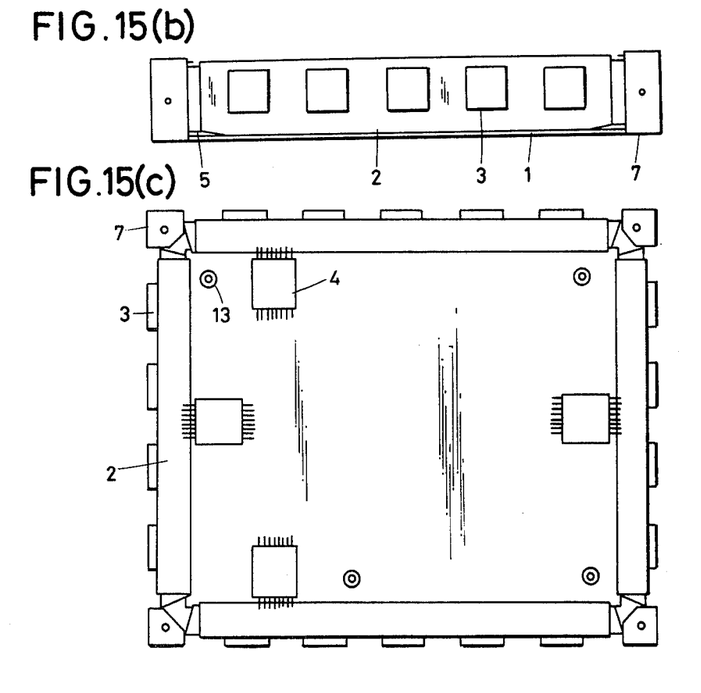
FIG. 15(b) shows a front view of the panel of FIG. 15(a)
FIG. 15(c) shows a botton view of the panel of FIG. 15(a)

More particularly, with reference to FIG. 14, the inner chassis 6 has the corner members 7 to which the corners of the EL display panel 1 are secured.

The polyamide film substrates 2 are bent along the sides of the inner chassis 6. An upper pressing element $9_1$ is provided for covering the upper polyamide film substrate and part of the side polyamide film substrates. A lower pressing element $9_2$ is provided for covering the lower polyamide film substrate and another part of the side polyamide film substrates. Thus, the four polyamide film substrates 2 are fixed to the inner chassis 6. Insulating sheets 5 and 8 are interposed between the substrates 2 and the chassis 6.

The cover 10-1 is secured to the combination of the EL display panel 1, the inner chassis 6, the polyamide film substrates 2 and the IC drivers 3. The printed circuit board 11 is disposed inside the inner chassis 6. The board 11 has a power supply circuit and a control circuit for controlling the IC drivers 3. The board 11 is fixed to terminals 13 of the chassis 6 with screws etc. The flat cable 4 is coupled to connectors 12 of the printed circuit board 11. Thus, the EL display panel assembly is completed as shown in FIGS. 15(a) to 15(c) and 16(a) to 16(c).

Figure 12:
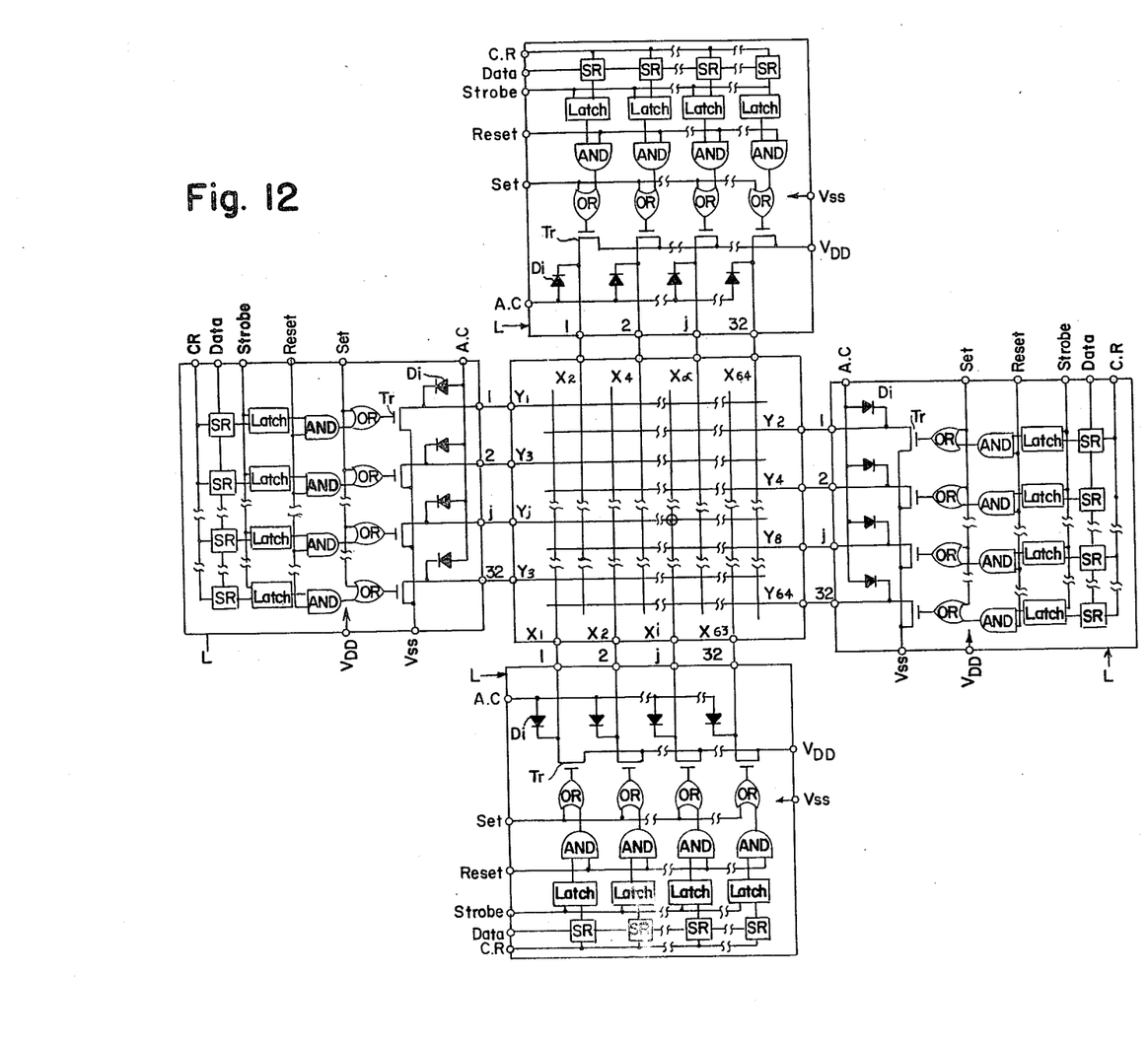
FIG. 12 shows a circuit diagram of the EL display panel assembly according to the present invention.
Figure 13:
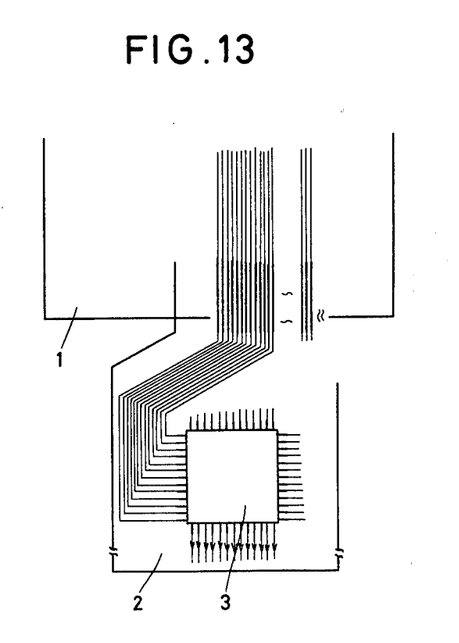
FIG. 13 shows a circuit connection between the EL display panel and the flexible substrate.

FIG. 12 shows a circuit configuration of the EL display panel assembly. For description, FIG. 12 indicates the EL display panel 1 and four of the IC drivers L around the panel 1. Each of the drivers L comprises shift registers (SR), latch circuits (LATCH), AND gates (AND), OR gates (OR), diodes (Di) and transistors (TR).

The shift registers (SR) receive clock signals and data signals as input signals. The latch circuits (LATCH) receive output signals from the shift registers, and strobe signals as input signals. The AND gates (AND) receive, as input signals, the output signals from the latch circuits, and reset signals. The OR gates (OR) receive, as input signals, the output signals from the AND gates, and set signals. The diodes (Di) are provided for generating EL driving voltages in response to application of voltages. The transistors (TR) receive, as input signals, the output signals from the OR gates, and the EL driving voltages so as to drive the EL display panel. One of the IC drivers drives 32 electrodes in the EL display panel 1.

Figure 11:
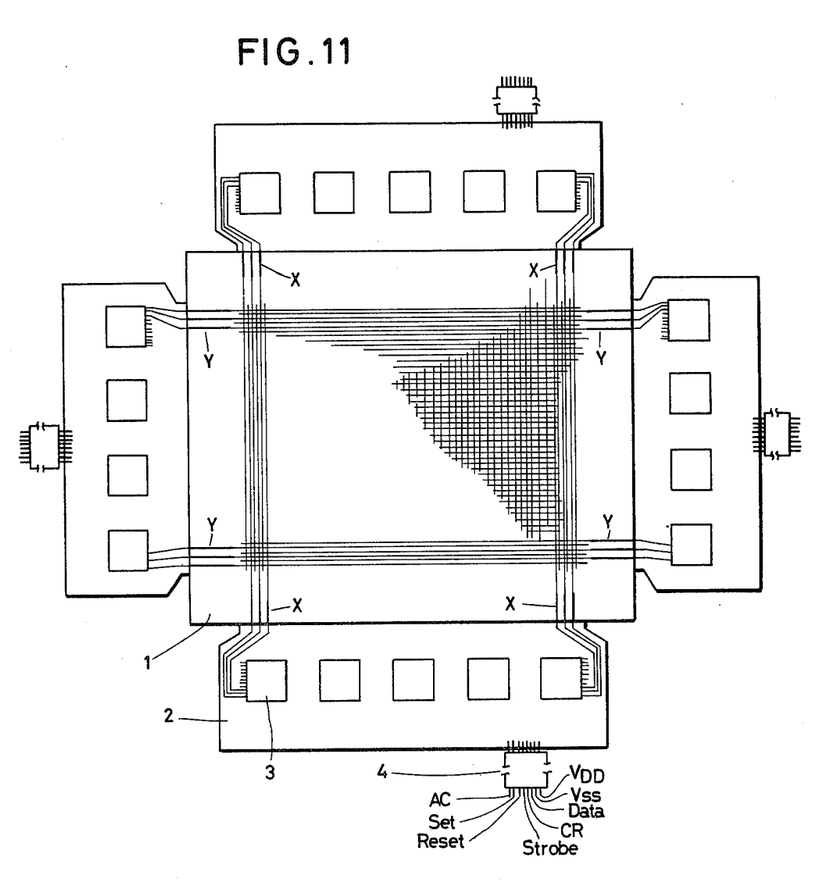
FIG. 11 shows a developing view of the combination of the flexible substrate and the EL display panel.

As shown in FIG. 11, the number of the IC drivers 3 for the X-axis electrodes is 5 in each side. The number of the IC drivers 3 for the Y-axis electrodes is 4 in each side. To all of the IC drivers 3 on each of the substrates 2, the flat cable 4 is connected to supply the clock signals (CR), the data signals (Data), the latch strobe signals (Strobe), the reset signals (Reset), the set signals (Set), power supply voltages (VDD) for anode common lines (A.C.) and power supply voltages (VSS) for logic circuits.

Figure 16A:
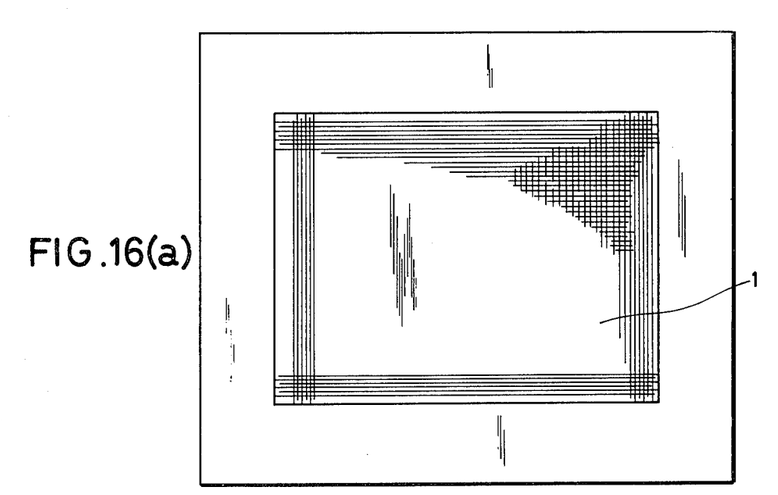
FIG. 16(a) shows a plan view of the EL display panel assembly.
Figures 16B, 16C, 16E:
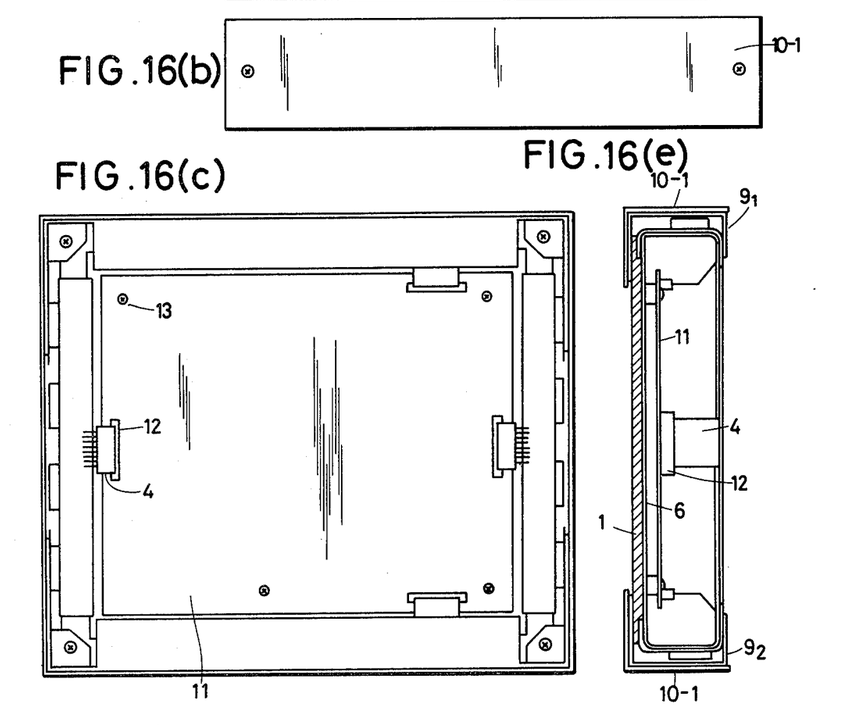
FIG. 16(b) shows a front view of the assembly of FIG. 16(a)
FIG. 16(e) shows a longitudinal sectional view of the assembly of FIG. 16(a).
Figure 16D:
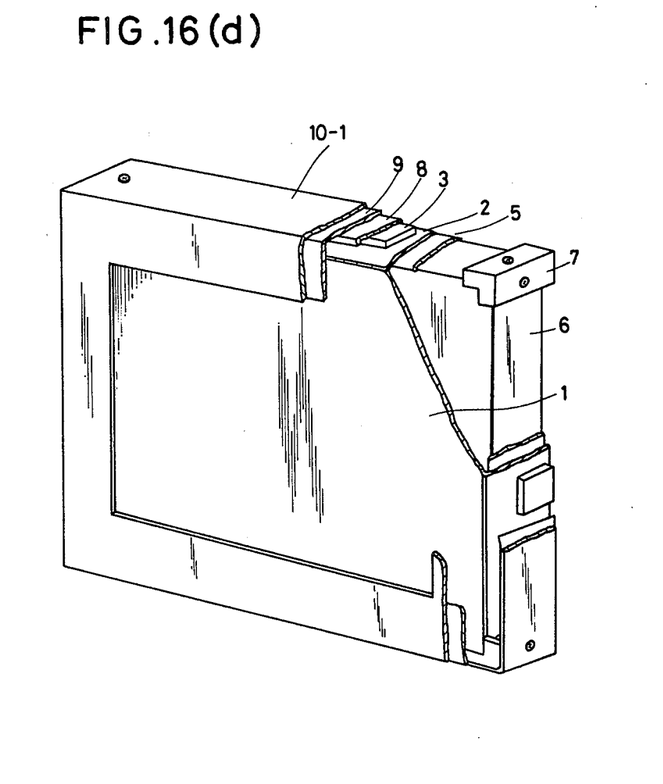
FIG. 16(d) shows a partially cutaway view of the assembly of FIG. 16(a)

As shown in FIGS. 16(a) to 16(c), the cover 10-1 has a window for entirely showing the front display surface of the EL display panel 1. At the back of the cover 10-1, the EL display panel 1 is fixed to the inner chassis 6. The EL display panel 1 together with the polyamide film substrates 2 is freely detachable from the back of the cover 10-1. The cover 10-1 can be fixed to the inner chassis 6 with screws etc.

The invention being thus described, it will be obvious that the same may be varied in many ways. Such variations are not to be regarded as a departure from the spirit and scope of the invention, and all such modifications are intended to be included within the scope of the following claims.

What is claimed is:

1. A matrix display panel circuit comprising:
a matrix display panel having four sides;
driver means for driving the matrix display panel, the driver means comprising first and second bi-directional shift register means of like construction for selectively selectively sending data to said display panel in an alternating fashion;
terminal means of the matrix display panel connected to the driver means, the terminal means being led out from at least two opposite sides of the display panel; and
flexible substrate means for supporting the driver means in such a manner that the configuration of said driver means on said flexible substrate means corresponding to one of said terminal means on one side of said matrix display panel is symmetrical to that of the flexible substrate means corresponding to said terminal means on the opposite side of said matrix display panel;
said first shift register means sending said data in a direction opposite to the direction data is sent by said second shift register means.

2. A matrix display panel circuit comprising:
a matrix display panel;
driver means for driving the matrix display panel;
terminal means of the matrix panel connected to the driver means, the terminal means being led out from at least two opposite sides of the display panel;
substrate means for supporting the matrix display panel; and
first and second IC chip means including said driver means, the driver means of each said chip means being connected to the terminal means at the two opposite sides of the matrix display panel;
the IC chip means being carried on the substrate means in such a manner that a main surface of the IC chip means corresponding to the terminal means on one side of said matrix display panel is in contact with one surface of the substrate means and a back surface of the IC chip means corresponding to the terminal means on the opposite side of said matrix display panel is in contact with the said one surface of said substrate means and said IC chip means on said opposite side are arranged as mirror images of said IC chip means on said one side.

3. The circuit of claim 1, wherein the flexible substrate means is adapted to be positioned at four sides of the matrix display panel.

4. The circuit of claim 1, further comprising chassis means for supporting the matrix display panel and the flexible substrate means.

5. The circuit of claim 4, wherein part of the flexible substrate means is bent along with at least one side of the chassis means.

6. The circuit of claim 4, further comprising circuit means for controlling the driver means, the circuit means being secured within the chassis means.

7. The circuit of claim 1, wherein the flexible substrate means is made of polyamide etc.

8. The circuit of claim 2, wherein the flexible substrate means is adapted to be positioned at four sides of the matrix display panel.

9. The circuit of claim 2, further comprising chassis means for supporting the matrix display panel and the flexible substrate means.

10. The circuit of claim 9, wherein part of the flexible substrate means is bent along with at least one side of the chassis means.

11. The circuit of claim 9, further comprising circuit means for controlling the driver means, the circuit means being secured within the chassis means.

12. The circuit of claim 2, wherein the flexible substrate means is made of polyamide.

13. A matrix display system comprising:
- a substrate having a first surface for supporting components thereon;
- a matrix display panel disposed on said first surface of said substrate and having at least one set of electrodes alternately extending from opposing sides of said display panel to form first and second electrode groups;
- means for driving said matrix display panel, said means for driving including first and second bi-directional shift register means of like construction mounted to said first surface of said substrate and respectively connected to said first and second electrode groups for sequentially addressing said set of electrodes.

14. The system of claim 13 wherein said first bi-directional shift register means and said second bi-directional shift register means are alternately shifted in opposite directions to sequentially address said set of electrodes.

15. A matrix display system comprising:
- a matrix display panel having terminal means for applying signals thereto, said terminal means extending from at least two opposing sides of said display panel;
- means for driving said matrix display panel by applying signals to said terminal means, said means for driving including first and second bi-directional shift register means of like construction, said first and second shift register means alternately driving said terminal means of said display panel to scan said panel;
- said first bi-directional shift register means and said second bi-directional shift register means are alternately shifted in opposite directions to sequentially address said terminal means.

* * * * *